US010855502B2

(12) United States Patent
Vermani et al.

(10) Patent No.: US 10,855,502 B2
(45) Date of Patent: Dec. 1, 2020

(54) SYSTEMS AND METHODS FOR IMPROVEMENTS TO TRAINING FIELD DESIGN FOR INCREASED SYMBOL DURATIONS

(71) Applicant: QUALCOMM Incorporated, San Diego, CA (US)

(72) Inventors: Sameer Vermani, San Diego, CA (US); Bin Tian, San Diego, CA (US); Rahul Tandra, Santa Clara, CA (US); Dung Ngoc Doan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 158 days.

(21) Appl. No.: 15/882,928

(22) Filed: Jan. 29, 2018

(65) Prior Publication Data

US 2018/0167249 A1 Jun. 14, 2018

Related U.S. Application Data

(63) Continuation of application No. 14/702,558, filed on May 1, 2015, now Pat. No. 9,900,199.
(Continued)

(51) Int. Cl.
*H04L 27/26* (2006.01)
*H04L 1/06* (2006.01)
(Continued)

(52) U.S. Cl.
CPC ....... *H04L 27/2613* (2013.01); *H04B 17/309* (2015.01); *H04L 1/0625* (2013.01);
(Continued)

(58) Field of Classification Search
CPC ............. H04L 27/2613; H04L 27/2611; H04L 27/2607; H04L 5/0048; H04L 25/0226
See application file for complete search history.

(56) References Cited

U.S. PATENT DOCUMENTS 8,462,863 B1 * 6/2013 Zhang ................. H04L 27/2613
375/260
9,900,199 B2 2/2018 Vermani et al.
(Continued)

FOREIGN PATENT DOCUMENTS

CN 101714896 A 5/2010
EP 1850549 A2 10/2007
(Continued)

OTHER PUBLICATIONS

International Search Report and Written Opinion—PCT/US2015/029054—ISA/EPO—dated Nov. 11, 2015.
(Continued)

*Primary Examiner* — Jamal Javaid
(74) *Attorney, Agent, or Firm* — Kevin M. Donnelly; Paradice and Li LLP

(57) ABSTRACT

Methods, devices, and computer program products for improving training field design in packets with increased symbol durations are disclosed. In one aspect, a method of transmitting a packet on a wireless communication network is disclosed. The method includes transmitting a preamble of the packet over one or more space-time-streams, the preamble including one or more training fields configured to be used for channel estimation, the one or more training fields each comprising one or more symbols of a first symbol duration. The method further includes transmitting a payload of the packet over the one or more space-time-streams, the payload comprising one or more symbols of a second symbol duration, the second symbol duration greater than the first symbol duration.

20 Claims, 12 Drawing Sheets

Related U.S. Application Data

(60) Provisional application No. 62/034,101, filed on Aug. 6, 2014, provisional application No. 61/989,397, filed on May 6, 2014.

(51) Int. Cl.
*H04L 5/00* (2006.01)
*H04L 25/02* (2006.01)
*H04B 17/309* (2015.01)

(52) U.S. Cl.
CPC .......... *H04L 1/0681* (2013.01); *H04L 5/0048* (2013.01); *H04L 25/0226* (2013.01); *H04L 27/2607* (2013.01); *H04L 27/2611* (2013.01)

(56) References Cited

U.S. PATENT DOCUMENTS

| | | |
|---|---|---|
| 2002/0181390 A1 | 12/2002 | Mody et al. |
| 2005/0180312 A1 | 8/2005 | Walton et al. |
| 2005/0180353 A1 | 8/2005 | Hansen et al. |
| 2005/0276347 A1 | 12/2005 | Mujtaba et al. |
| 2010/0046361 A1 | 2/2010 | Jeong et al. |
| 2010/0284266 A1 | 11/2010 | Jang et al. |
| 2012/0147866 A1 | 6/2012 | Stacey et al. |
| 2012/0263108 A1 | 10/2012 | Ban et al. |
| 2014/0328242 A1* | 11/2014 | Tong ............... H04W 48/00 370/312 |
| 2015/0372848 A1 | 12/2015 | Vermani |
| 2015/0372849 A1 | 12/2015 | Vermani |

FOREIGN PATENT DOCUMENTS

| | | |
|---|---|---|
| EP | 2034646 A1 | 3/2009 |
| JP | 2012129866 A | 7/2012 |
| JP | 2013102466 A | 5/2013 |
| WO | WO-2005081445 A1 | 9/2005 |
| WO | WO-2006138206 A1 | 12/2006 |

OTHER PUBLICATIONS

Qualcomm Inc, "Further details on CSI-RS. [online]", 3GPP TSG-RAN WG1 #59bis R1-100681, Jan. 12, 2010,< http://www.3gpp.org/ftp/tsg_ran/wg1_rl1/TSGR1_59b/Docs/>.

Ward L., "802.11ac Technology Introduction White Paper", Rhode and Schwarz, Mar. 1, 2012 (Mar. 1, 2012), XP055084958, Retrieved from the Internet: URL:http://cdn.rohde-schwarz.com/dl_downloads/dl_application/application_notes/1ma192/1MA192_7e_80211ac_technology.pdf [retrieved on Oct. 22, 2013], the whole document.

\* cited by examiner

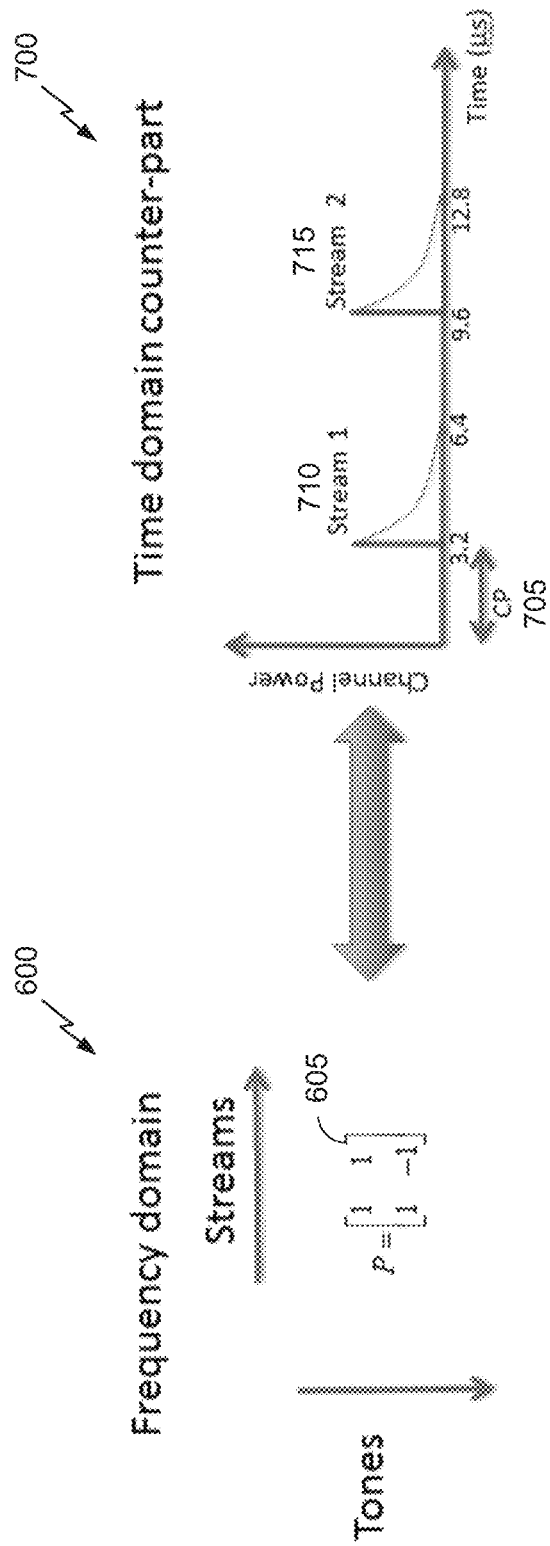

$$P_{4\times 4} = \begin{pmatrix} 1 & -1 & 1 & 1 \\ 1 & 1 & -1 & 1 \\ 1 & 1 & 1 & -1 \\ -1 & 1 & 1 & 1 \end{pmatrix} \downarrow \text{Spatial stream}$$

→Time

FIG. 11A

| Nss=4, P-matrix | | | | |
|---|---|---|---|---|
| Tone | LTF1 | LTF2 | LTF3 | LTF4 |
| 1 | x1+x2+x3-x4 | -x1+x2+x3+x4 | x1-x2+x3+x4 | x1+x2-x3+x4 |
| 2 | x1+x2+x3-x4 | -x1+x2+x3+x4 | x1-x2+x3+x4 | x1+x2-x3+x4 |
| 3 | x1+x2+x3-x4 | -x1+x2+x3+x4 | x1-x2+x3+x4 | x1+x2-x3+x4 |
| 4 | x1+x2+x3-x4 | -x1+x2+x3+x4 | x1-x2+x3+x4 | x1+x2-x3+x4 |
| 5 | x1+x2+x3-x4 | -x1+x2+x3+x4 | x1-x2+x3+x4 | x1+x2-x3+x4 |
| 6 | x1+x2+x3-x4 | -x1+x2+x3+x4 | x1-x2+x3+x4 | x1+x2-x3+x4 |
| 7 | x1+x2+x3-x4 | -x1+x2+x3+x4 | x1-x2+x3+x4 | x1+x2-x3+x4 |
| 8 | x1+x2+x3-x4 | -x1+x2+x3+x4 | x1-x2+x3+x4 | x1+x2-x3+x4 |

FIG. 11B

1200A $$P_{2\times 2} = \begin{pmatrix} 1 & -1 \\ 1 & 1 \end{pmatrix} \downarrow \text{Spatial stream}$$
$\rightarrow$Time

FIG. 12A

1200B $$P_{4\times 2}(\text{odd tone}) = \begin{pmatrix} 1 & -1 \\ 1 & 1 \\ 0 & 0 \\ 0 & 0 \end{pmatrix},$$
1210A

1205B $$P_{4\times 2}(\text{even tone}) = \begin{pmatrix} 0 & 0 \\ 0 & 0 \\ 1 & -1 \\ 1 & 1 \end{pmatrix}$$
1210B

| Nss=4, P-matrix with Ng=2 | | |
|---|---|---|
| Tone | LTF1 | LTF2 |
| 1 | x1+x2 | -x1+x2 |
| 2 | x3+x4 | -x3+x4 |
| 3 | x1+x2 | -x1+x2 |
| 4 | x3+x4 | -x3+x4 |
| 5 | x1+x2 | -x1+x2 |
| 6 | x3+x4 | -x3+x4 |
| 7 | x1+x2 | -x1+x2 |
| 8 | x3+x4 | -x3+x4 |

1210A (LTF1 column), 1210B (LTF2 column)

FIG. 12C

| Nss=4, P-matrix with Ng=4 ||
|---|---|
| Tone | LTF1 |
| 1 | x1 |
| 2 | x2 |
| 3 | x3 |
| 4 | x4 |
| 5 | x1 |
| 6 | x2 |
| 7 | x3 |
| 8 | x4 |

FIG. 13A

| Nss=3, P-matrix with Ng=2 |||
|---|---|---|
| Tone | LTF1 | LTF2 |
| 1 | x1+x2 | -x1+x2 |
| 2 | x1+x3 | -x1+x3 |
| 3 | x2+x3 | -x2+x3 |
| 4 | x1+x2 | -x1+x2 |
| 5 | x1+x3 | -x1+x3 |
| 6 | x2+x3 | -x2+x3 |

FIG. 13B

| Nss=3, P-matrix with Ng=2 |||
|---|---|---|
| Tone | LTF1 | LTF2 |
| 1 | x1+x2 | -x1+x2 |
| 2 | x3 | x3 |
| 3 | x1+x2 | -x1+x2 |
| 4 | x3 | x3 |
| 5 | x1+x2 | -x1+x2 |
| 6 | x3 | x3 |

FIG. 13C

SYSTEMS AND METHODS FOR IMPROVEMENTS TO TRAINING FIELD DESIGN FOR INCREASED SYMBOL DURATIONS

CROSS REFERENCE TO RELATED APPLICATION(S)

This application is a continuation of U.S. application Ser. No. 14/702,558, titled "SYSTEMS AND METHODS FOR IMPROVEMENTS TO TRAINING FIELD DESIGN FOR INCREASED SYMBOL DURATIONS" and filed on May 1, 2015, which claims the benefit of: U.S. Provisional Patent Application 62/034,101, titled "SYSTEMS AND METHODS FOR IMPROVEMENTS TO TRAINING FIELD DESIGN FOR INCREASED SYMBOL DURATIONS" and filed on Aug. 6, 2014; and U.S. Provisional Patent Application 61/989,397, titled "SYSTEMS AND METHODS FOR IMPROVEMENTS TO TRAINING FIELD DESIGN FOR INCREASED SYMBOL DURATIONS" and filed on May 6, 2014. The content of these prior applications are considered part of this application and are hereby incorporated by reference in their entirety.

TECHNICAL FIELD

The present application relates generally to wireless communications, and more specifically to systems, methods, and devices for improvements to long training field design for longer symbol durations. Certain aspects herein relate to reducing the overhead which can otherwise be associated with long training fields when longer symbol durations are used.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network can transmit/receive information between each other. The information can comprise packets, which in some aspects can be referred to as data units. Each data unit can be made up of a number of symbols, each of which can be of a particular duration. Longer symbol durations can be desirable in certain environments, such as when transmitting over longer distances, or such as when transmitting in outdoor environments. However, transmitting longer symbols can increase network overhead for certain aspects of transmissions. Accordingly, it may be desirable to minimize this overhead.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced overhead in certain transmissions with increased symbol length.

One aspect of the disclosure provides a method of transmitting a packet on a wireless communication network. The method comprises transmitting a preamble of the packet over one or more space-time-streams, the preamble including one or more training fields configured to be used for channel estimation, the one or more training fields each comprising one or more symbols of a first symbol duration. The method further comprises transmitting a payload of the packet over the one or more space-time-streams, the payload comprising one or more symbols of a second symbol duration, the second symbol duration greater than the first symbol duration.

In one aspect, a wireless communication apparatus is disclosed. The apparatus comprises a processor configured to generate a preamble of a packet, the preamble to be transmitted over one or more space-time-streams, the preamble including one or more training fields configured to be used for channel estimation, the one or more training fields each comprising one or more symbols of a first symbol duration. The processor is also configured to generate a payload of the packet, the payload to be transmitted over the one or more space-time-streams, the payload comprising one or more symbols of a second symbol duration, the second symbol duration greater than the first symbol duration. The apparatus further comprises a transmitter configured to transmit the packet.

Some aspects of the present disclosure relate to a non-transitory computer readable medium comprising instructions that when executed cause a processor in a device to perform a method of transmitting a packet over a wireless communication network. The method comprises transmitting a preamble of the packet over one or more space-time-streams, the preamble including one or more training fields configured to be used for channel estimation, the one or more training fields each comprising one or more symbols of a first symbol duration. The method also comprises transmitting a payload of the packet over the one or more space-time-streams, the payload comprising one or more symbols of a second symbol duration, the second symbol duration greater than the first symbol duration.

In one aspect, a wireless communication apparatus is disclosed. The apparatus comprises means for generating a preamble of a packet to be transmitted over one or more space-time-streams, the preamble including one or more training fields configured to be used for channel estimation, the one or more training fields each comprising one or more symbols of a first symbol duration. The apparatus further comprises means for generating a payload of the packet to be transmitted over the one or more space-time-streams, the payload comprising one or more symbols of a second symbol duration, where the second symbol duration is greater than the first symbol duration. The apparatus further comprises means for transmitting the packet.

One aspect of the disclosure provides a method of transmitting a packet on a wireless communication network. The method comprises transmitting a preamble of the packet over $N_{STS}$ space-time-streams over a plurality of tones, the preamble including $N_{TF}$ training fields configured to be used for channel estimation for each of the plurality of space-time-streams, where $N_{STS}$ is greater than one and $N_{TF}$ is less than $N_{STS}$. The method further comprises transmitting a payload of the packet over the $N_{STS}$ space-time-streams.

In one aspect, a wireless communication apparatus is disclosed. The apparatus comprises a processor configured to generate a preamble of a packet over $N_{STS}$ space-time-streams over a plurality of tones, the preamble including $N_{TF}$ training fields configured to be used for channel estimation for each of the plurality of space-time-streams, where $N_{STS}$ is greater than one and $N_{TF}$ is less than $N_{STS}$. The processor is further configured to generate a payload of the packet to be transmitted over the $N_{STS}$ space-time-streams. The apparatus further comprises a transmitter configured to transmit the packet.

Some aspects of the present disclosure relate to a non-transitory computer readable medium comprising instructions that when executed cause a processor in a device to perform a method of transmitting a packet over a wireless communication network. The method comprises transmitting a preamble of the packet over $N_{STS}$ space-time-streams over a plurality of tones, the preamble including $N_{TF}$ training fields configured to be used for channel estimation for each of the plurality of space-time-streams, where $N_{STS}$ is greater than one and $N_{TF}$ is less than $N_{STS}$. The method further comprises transmitting a payload of the packet over the $N_{STS}$ space-time-streams.

In one aspect, a wireless communication apparatus is disclosed. The apparatus comprises means for transmitting a preamble of a packet over $N_{STS}$ space-time-streams over a plurality of tones, the preamble including $N_{TF}$ training fields configured to be used for channel estimation for each of the plurality of space-time-streams, where $N_{STS}$ is greater than one and $N_{TF}$ is less than $N_{STS}$. The apparatus further comprises means for transmitting a payload of the packet over the $N_{STS}$ space-time-streams.

One aspect of the disclosure provides a method of transmitting a packet on a wireless communication network. The method comprises transmitting a preamble of the packet over $N_{STS}$ space-time-streams over a plurality of tones, the preamble including $N_{TF}$ training fields configured to be used for channel estimation for each of the plurality of space-time-streams, where a subset of the $N_{STS}$ space-time-streams is active on each tone. The method further comprises transmitting a payload of the packet over the $N_{STS}$ space-time-streams.

In one aspect, a wireless communication apparatus is disclosed. The apparatus comprises a processor configured to generate a preamble of a packet over $N_{STS}$ space-time-streams over a plurality of tones, the preamble including $N_{TF}$ training fields configured to be used for channel estimation for each of the plurality of space-time-streams, where a subset of the $N_{STS}$ space-time-streams is active on each tone. The processor is further configured to generate a payload of the packet to be transmitted over the $N_{STS}$ space-time-streams. The apparatus further comprises a transmitter configured to transmit the packet.

Some aspects of the present disclosure relate to a non-transitory computer readable medium comprising instructions that when executed cause a processor in a device to perform a method of transmitting a packet over a wireless communication network. The method comprises transmitting a preamble of the packet over $N_{STS}$ space-time-streams over a plurality of tones, the preamble including $N_{TF}$ training fields configured to be used for channel estimation for each of the plurality of space-time-streams, where a subset of the $N_{STS}$ space-time-streams is active on each tone. The method further comprises transmitting a payload of the packet over the $N_{STS}$ space-time-streams.

In one aspect, a wireless communication apparatus is disclosed. The apparatus comprises means for transmitting a preamble of a packet over $N_{STS}$ space-time-streams over a plurality of tones, the preamble including $N_{TF}$ training fields configured to be used for channel estimation for each of the plurality of space-time-streams, where a subset of the $N_{STS}$ space-time-streams is active on each tone. The apparatus further comprises means for transmitting a payload of the packet over the $N_{STS}$ space-time-streams.

BRIEF DESCRIPTION OF THE DRAWINGS

FIG. 6 is an illustration of a matrix that can be used as a frequency domain P-matrix in order to generate LTFs.

FIG. 7 illustrates the time-domain counterpart to the frequency domain mapping of FIG. 6.

FIG. 11A is an illustration of a matrix that can be used as a frequency domain P-matrix in order to generate LTFs.

FIG. 11B is a table showing LTF signals generated using the matrix of FIG. 11A.

FIG. 12A is an illustration of a matrix that can be used as a frequency domain P-matrix in order to generate LTFs according to a tone-grouping embodiment.

FIG. 12B is an illustration of tone-dependent matrices that can be used as frequency domain P-matrices in order to generate LTFs according to a tone-grouping embodiment.

FIG. 12C is a table showing LTF signals generated using the matrixes of FIGS. 12A-12B.

FIG. 13A is a table showing an LTF spatial stream tone mapping according to one embodiment.

FIG. 13B is a table showing an LTF spatial stream tone mapping according to another embodiment.

FIG. 13C is a table showing an LTF spatial stream tone mapping according to another embodiment.

DETAILED DESCRIPTION

Figure 1:
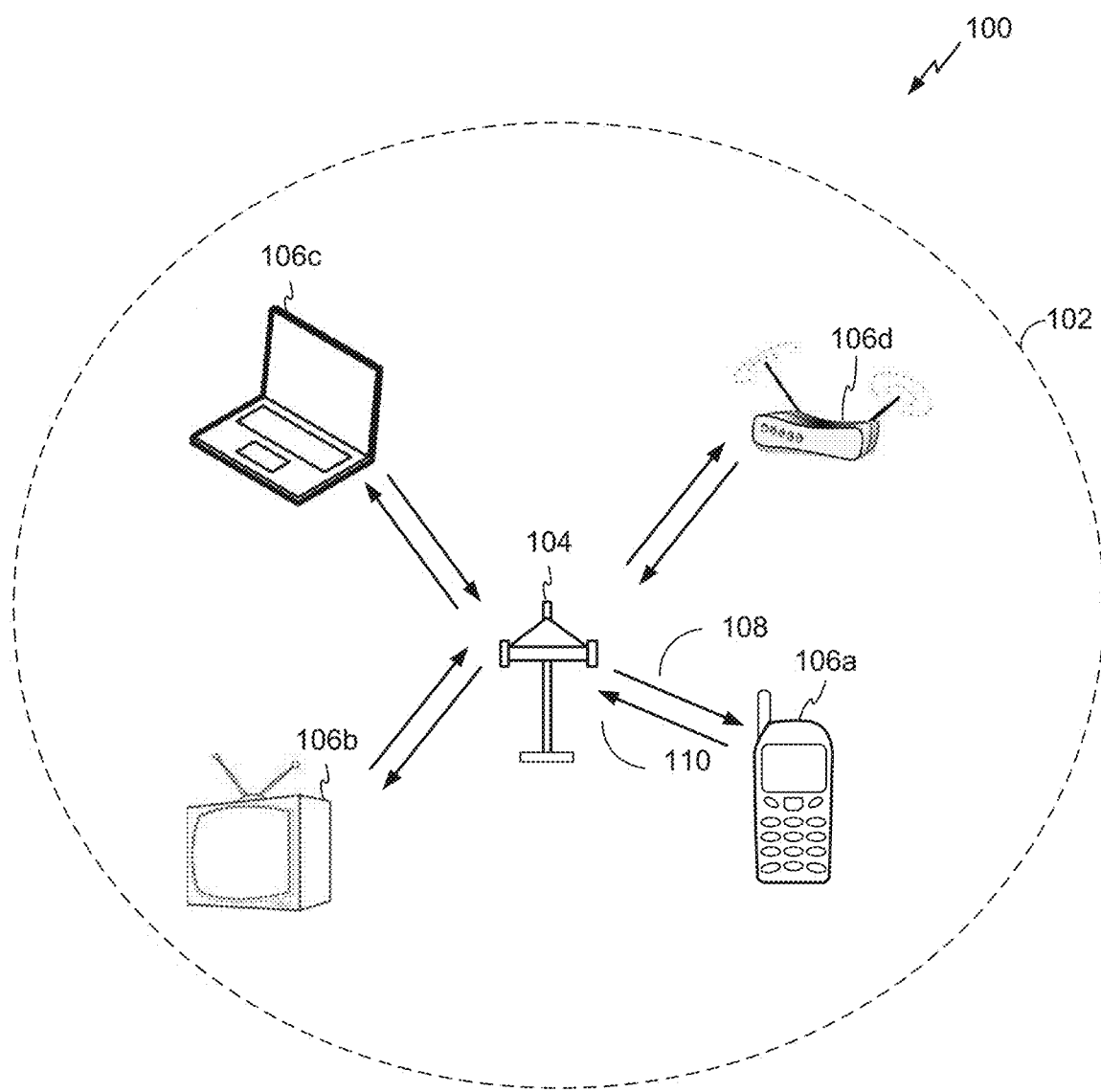
FIG. 1 illustrates an example of a wireless communication system in which aspects of the present disclosure can be employed.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols. For example, the various aspects described herein can be used as part of the IEEE 802.11ax protocol.

In some implementations, a WLAN includes various devices which are the components that access the wireless network. For example, there can be two types of devices: access points ("APs") and clients (also referred to as stations, commonly known as "STAs"). In general, an AP serves as a hub or base station for the WLAN and an STA serves as a user of the WLAN. For example, an STA can be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA can also be used as an AP.

An access point ("AP") can also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example the 802.11ax standard. The wireless communication system 100 can include an AP 104, which communicates with STAs 106a-d (referred to herein as STAs 106).

A variety of processes and methods can be used for transmissions in the wireless communication system 100 between the AP 104 and the STAs 106. For example, signals can be sent and received between the AP 104 and the STAs 106 in accordance with OFDM/OFDMA techniques. If this is the case, the wireless communication system 100 can be referred to as an OFDM/OFDMA system. Alternatively, signals can be sent and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can act as a base station and provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
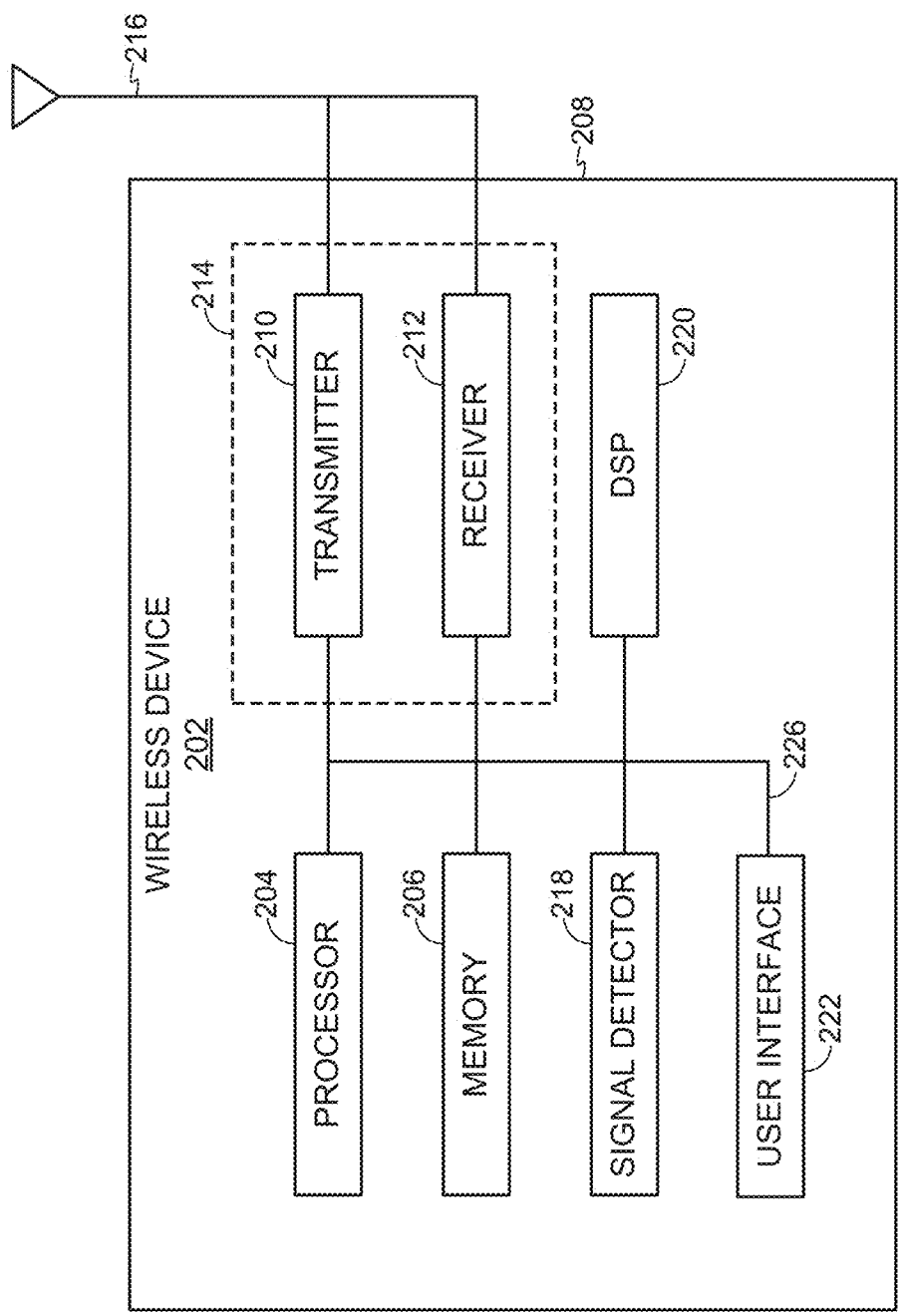
FIG. 2 shows a functional block diagram of an exemplary wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

Figure 3:
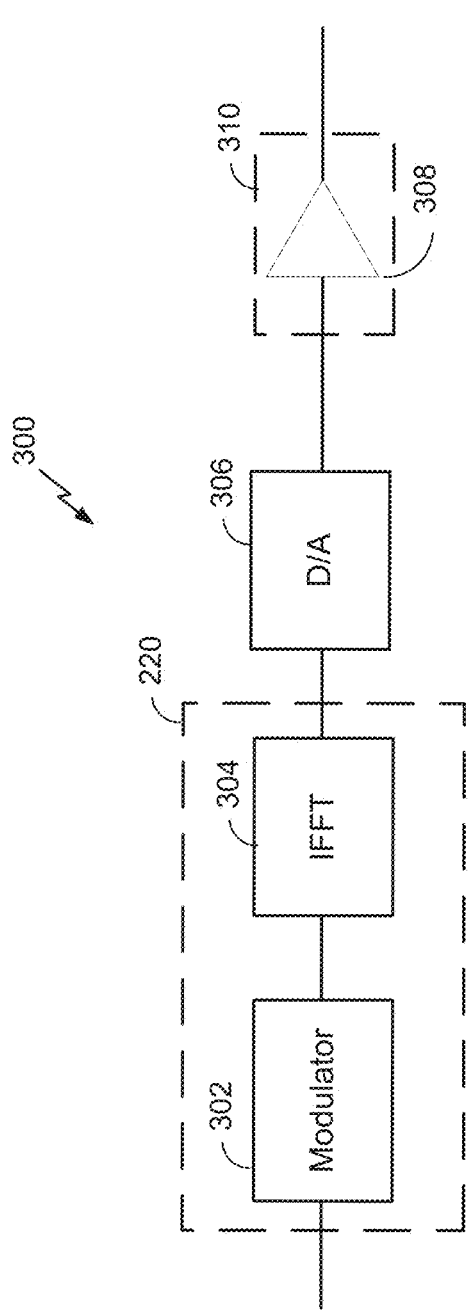
FIG. 3 shows a functional block diagram of exemplary components that can be utilized with the wireless device of FIG. 2 to transmit wireless communications.

As discussed above, the wireless device 202 can comprise an AP 104 or an STA 106, and can be used to transmit and/or receive communications. FIG. 3 illustrates a transmitter module 300 that can be utilized in the wireless device 202 to transmit wireless communications. The components illustrated in FIG. 3 can be used, for example, to transmit OFDM communications.

The transmitter module 300 can comprise a modulator 302 configured to modulate bits for transmission. For example, if the transmitter module 300 is used as a component of wireless device 202 in FIG. 2, the modulator 302 can determine a plurality of symbols from bits received from the processor 204 or the user interface 222, for example by mapping bits to a plurality of symbols according to a constellation. The bits can correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The transmitter module 300 can further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there can be multiple transform modules (not shown) that transform units of data of different sizes.

In FIG. 3, the modulator 302 and the transform module 304 are illustrated as being implemented in the DSP 220. In some aspects, however, one or both of the modulator 302 and the transform module 304 can be implemented in other components of wireless device 202, such as in the processor 204.

Generally, the DSP 220 can be configured to generate a data unit for transmission. In some aspects, the modulator 302 and the transform module 304 can be configured to generate a data unit comprising a plurality of fields including control information and a plurality of data symbols. The fields including the control information can comprise one or more training fields, for example, and one or more signal (SIG) fields. Each of the training fields can include a known sequence of bits or symbols. Each of the SIG fields can include information about the data unit, for example a description of a length or data rate of the data unit.

Returning to the description of FIG. 3, the transmitter module 300 can further comprise a digital to analog converter 306 configured to convert the output of the transform module into an analog signal. For example, the time-domain output of the transform module 306 can be converted to a baseband OFDM signal by the digital to analog converter 306. In some aspects, portions of the transmitter module 300 can be included in wireless device 202 from FIG. 2. For example, the digital to analog converter 306 can be implemented in the processor 204, the transceiver 214, or in another element of the wireless device 202.

The analog signal can be wirelessly transmitted by the transmitter 310. The analog signal can be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal can be amplified by the transmit amplifier 308. In some aspects, the amplifier 308 comprises a low noise amplifier (LNA).

The transmitter 310 is configured to transmit one or more packets or data units in a wireless signal based on the analog signal. The data units can be generated using a processor and/or the DSP 220, for example using the modulator 302 and the transform module 304 as discussed above. Data units that can be generated and transmitted as discussed above are described in additional detail below with respect to FIGS. 5-14.

Figure 4:
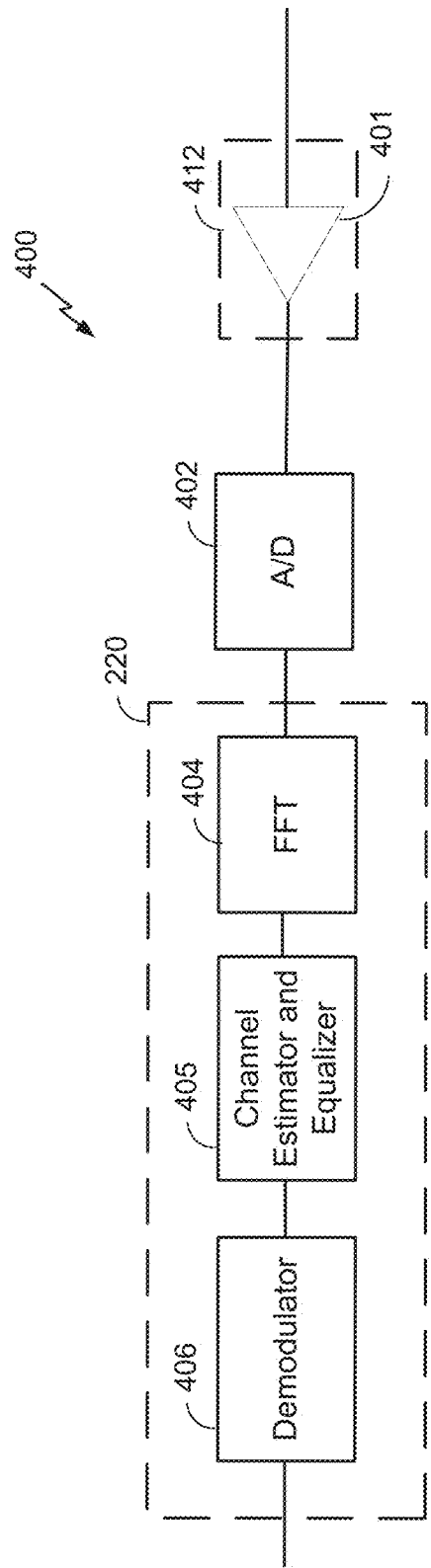
FIG. 4 shows a functional block diagram of exemplary components that can be utilized with the wireless device of FIG. 2 to receive wireless communications.

FIG. 4 illustrates a receiving module 400 that can be utilized in the wireless device 202 to receive wireless communications. The components illustrated in FIG. 4 can be used, for example, to receive OFDM communications. In some aspects, the components illustrated in FIG. 4 are used to receive data units that include one or more training fields, as will be discussed in additional detail below. For example, the components illustrated in FIG. 4 can be used to receive data units transmitted by the components discussed above with respect to FIG. 3.

The receiver 412 is configured to receive one or more packets or data units in a wireless signal. Data units that can be received and decoded or otherwise processed as discussed below are described in additional detail with respect to FIGS. 5-14.

In the aspect illustrated in FIG. 4, the receiver 412 includes a receive amplifier 401. The receive amplifier 401 can be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The receiving module 400 can comprise an analog to digital converter 402 configured to convert the amplified wireless signal from the receiver 412 into a digital representation thereof. Further to being amplified, the wireless signal can be processed before being converted by the digital to analog converter 402, for example by being filtered or by being downconverted to an intermediate or baseband frequency. In some aspects, the analog to digital converter 402 can be implemented in the processor 204 of FIG. 2, the transceiver 214, or in another element of the wireless device 202.

The receiving module 400 can further comprise a transform module 404 configured to convert the representation the wireless signal into a frequency spectrum. In FIG. 4, the transform module 404 is illustrated as being implemented by a fast Fourier transform (FFT) module. In some aspects, the transform module can identify a symbol for each point that it uses.

The receiving module 400 can further comprise a channel estimator and equalizer 405 configured to form an estimate of the channel over which the data unit is received, and to remove certain effects of the channel based on the channel estimate. For example, the channel estimator can be configured to approximate a function of the channel, and the channel equalizer can be configured to apply an inverse of that function to the data in the frequency spectrum.

In some aspects, the channel estimator and equalizer 405 uses information in one or more received training fields, such as a long training field (LTF) for example, to estimate the channel. The channel estimate can be formed based on one or more LTFs received at the beginning of the data unit. This channel estimate can thereafter be used to equalize data symbols that follow the one or more LTFs. After a certain period of time or after a certain number of data symbols, one or more additional LTFs can be received in the data unit. The channel estimate can be updated or a new estimate formed using the additional LTFs. This new or update channel estimate can be used to equalize data symbols that follow the additional LTFs. In some aspects, the new or updated channel estimate is used to re-equalize data symbols preceding the additional LTFs. Those having ordinary skill in the art will understand methods for forming a channel estimate.

The receiving module 400 can further comprise a demodulator 406 configured to demodulate the equalized data. For example, the demodulator 406 can determine a plurality of bits from symbols output by the transform module 404 and the channel estimator and equalizer 405, for example by reversing a mapping of bits to a symbol in a constellation. In some aspects, where the receiving module 400 is implemented as a portion of wireless device 202, the bits can be processed or evaluated by the processor 204, or used to display or otherwise output information to the user interface 222. In this way, data and/or information can be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 can be implemented in another component of wireless device 202, such as in the processor 204.

As discussed above, the wireless signal received at the receiver 412 comprises one or more data units. These data units can be decoded, evaluated and/or processed using the components described above. For example, a processor and/or the DSP 220 can be used to decode data symbols in the data units using the transform module 404, the channel estimator and equalizer 405, and the demodulator 406.

Data units exchanged by the AP 104 and the STAs 106 can include control information or data. At the physical (PHY) layer, these data units can be referred to as physical layer protocol data units (PPDUs). In some aspects, a PPDU can be referred to as a packet or physical layer packet. Each PPDU can comprise a preamble and a payload. The preamble can include training fields and a SIG field. For example, the training fields can include one or more long training field (LTF) and one or more short training field (STF). The payload can comprise a Media Access Control (MAC) header and/or user data. The payload can be transmitted using one or more data symbols, such as BPSK symbols or QPSK symbols.

In some aspects, it can be desirable to increase the robustness of propagation in outdoor environments. For example, in an outdoor environment, there can be a much higher delay spread. This can be caused by, for example, transmissions echoing off of more distant surfaces than can be present in indoor environments. Accordingly, this higher delay spread can cause inter-symbol interference (ISI) when a cyclic prefix (CP) of relatively short duration is used. For example, in the IEEE 802.11ac standard, a normal CP is 0.8 µs, while when a short guard interval (GI) is used, the CP can be 0.4 µs. These CP lengths can cause problems with ISI in an outdoor environment, and performance of the network can be degraded in such an environment. Accordingly, in order to provide for more robust performance in an outdoor environment, it can be desirable to increase the CP of each symbol.

However, increasing the CP of each symbol can increase the overhead of each symbol. For example, an IEEE 802.11ac symbol is 3.2 µs. Thus, the CP overhead of an IEEE 802.11ac symbol is 25% for a normal GI transmission with 0.8 µs CP, and is 12.5% for a short GI transmission with 0.4 µs CP. However, if the CP is increased, for example to 3.2 µs, and if symbol length is kept constant, the overhead of the CP would increase to 100%. Accordingly, when increasing CP, it can also be desirable to increase symbol length. For example, symbol length can be increased to 4 or 8 times as long as in an IEEE 802.11ac packet, to 12.8 or 25.6 µs. By increasing symbol length, a longer CP can be used, while keeping CP overhead low. However, longer symbols and longer CPs can result in an increase in the length of the preamble of a packet. For example, LTFs can be used for channel estimation, and if CP and symbol length are each increased by 4 or 8 times, each LTF can accordingly also take 4 or 8 times longer to transmit. In some aspects, it can be desirable to decrease the amount of time used to transmit LTFs for packets with increased CP and symbol length, and accordingly, to decrease the LTF overhead of such a packet. Generally, it can be desirable to maintain a ratio in which CP length is 25% or less than a duration of a data symbol, and so CP overhead can be said to be 25% or less.

Generally, when a single space-time-stream is used to transmit a packet, a single LTF can be used. The most rudimentary approach for such a packet, when using symbols which are N times longer than ordinary IEEE 802.11ac 3.2 µs symbols would be to transmit an LTF which is, likewise, N times longer than an ordinary IEEE 802.11ac LTF. However, several methods can be used to reduce the length of such an LTF, which can reduce the overhead caused by LTFs on such a packet.

In some aspects, LTFs can use a different symbol duration than those used in the data portion of a packet. For example, a data symbol in a packet can be N times longer than a data symbol in an IEEE 802.11ac packet, while an LTF symbol in a packet can be M times longer than a data symbol in an IEEE 802.11ac packet, where M is less than N. For example, if data symbols in a given packet are four times longer, that is, 12.8 µs, and LTF can use symbols which are the same length or only twice as long as in an IEEE 802.11ac packet, that is, 3.2 or 6.4 µs. By using shorter symbols during an LTF, the duration of the LTF can be reduced accordingly.

Because each symbol can be of a longer duration, each symbol can contain more data tones. For example, a symbol which is four times longer than an IEEE 802.11ac data symbol can contain four times as many data tones within the same bandwidth. Thus, while a 20 MHz bandwidth can carry 64 tones in IEEE 802.11ac, the same bandwidth can carry 256 tones if each symbol is four times longer. Accordingly, when the symbol length for an LTF is shorter than the symbol length for data symbols, a receiving device can require interpolation to decode data in the data section of the packet. Further, reducing the symbol duration in the LTF may only be effective if ISI, due to channel delay spread, is not an issue with the symbol duration in the LTF.

If ISI is problematic when using shorter symbols in an LTF than in the data portion of a packet, the CP in the LTF can be increased. For example, an LTF can have CP overhead that is higher than 25%, while it can be desirable to keep such overhead to 25% or less in the data portion of the packet. Increasing the CP length in the LTF, from the CP length in an IEEE 802.11ac packet, can allow such an LTF to exhibit more robust performance in an outdoor propagation environment, while still allowing for the LTF to use a shorter symbol duration than other portions of the packet, such as the data portion of the packet. Thus, even with increased CP overhead in the LTF, LTF overhead (LTF length as compared to total length of the packet) can still be reduced. In some aspects, the CP of two LTF symbols can be combined together, into a double-length CP, followed by two LTF symbols which are not separated from each other by a CP.

Generally, in packets which are transmitted using multiple space-time-streams, the number of LTFs ($N_{LTF}$ or $N_{TF}$) in a packet corresponds to the number of space-time-streams ($N_{STS}$) in the packet. For example, the number of LTFs can be the same as the number of streams, or can, be a one-to-one mapping from the number of space-time-streams. That is, if there is some known number of space-time-streams, such as five, there will be a known number of LTFs in the packet, such as five. If, in such a packet, the length of CPs and symbols is increased, such as increased by eight times, the length of the LTFs can also increase by eight times, as above. A number of different approaches can be used to reduce this LTF overhead caused by the additional LTFs that must be transmitted with each transmission.

For example, each of the $N_{LTF}$ LTFs can be transmitted at an M times symbol duration, compared to the duration of a IEEE 802.11ac packet, while the data portion of the packet can be transmitted at an N times symbol duration, where N>M. This can reduce the length of each LTF in a similar manner to that discussed above with reference to the single space-time-stream packet. Similarly, as with a single space-time-stream packet, CP size can be increased relative to the size of the LTF symbol duration as needed in order to avoid ISI. For example, an LTF symbol duration can be the same as that found in an IEEE 802.11ac packet (3.2 µs), and the CP duration in an LTF can be four times that of the CP duration of an IEEE 802.11ac packet, that is, also 3.2 µs. Increasing the duration of the CP relative to the duration of an LTF symbol will increase the CP overhead of the LTF, but by having a LTF symbols with a shorter duration relative to the duration of symbols found in the data portion of the packet, the overall duration of the LTF section can still be decreased. Accordingly, using this concept, the number of LTFs can remain the same as in an IEEE 802.11ac packet with the same number of space-time-streams, but the duration of each individual LTF can be reduced, due to a smaller symbol size in the LTF than is found in the data portion of the packet. This is unlike an ordinary IEEE 802.11ac packet, which contains a symbol size that is the same in both the LTF and the data portion of the packet.

Rather than decreasing the duration of each individual LTF, transmitting a reduced number of LTFs can also reduce the total duration of the LTF portion of a packet. In an IEEE 802.11ac packet, the number of LTFs transmitted in a packet ($N_{LTF}$) is based on the number of space-time-streams in that packet ($N_{STS}$). For example, the correspondence between $N_{LTF}$ and $N_{STS}$ in an IEEE 802.11ac packet is given by the following table:

TABLE 1

| $N_{STS}$ | $N_{LTF}$ |
|---|---|
| 1 | 1 |
| 2 | 2 |
| 3 | 4 |
| 4 | 4 |
| 5 | 6 |
| 6 | 6 |
| 7 | 8 |
| 8 | 8 |

However, in some aspects, it can be possible to transmit fewer LTFs than this, in order to reduce the duration of the LTF portion of a given packet, where that packet has an increased symbol duration compared to an IEEE 802.11ac packet. In some aspects, transmitting fewer LTFs can be done together with, or separate from, using a shorter duration symbol in LTFs than in the data portion of a packet. Different methods can be used to transmit fewer LTFs in a given packet than the number of LTFs contained in an IEEE 802.11ac packet. The method that is used can depend, at least in part, on an LTF format that is used in a given packet.

Figure 5:
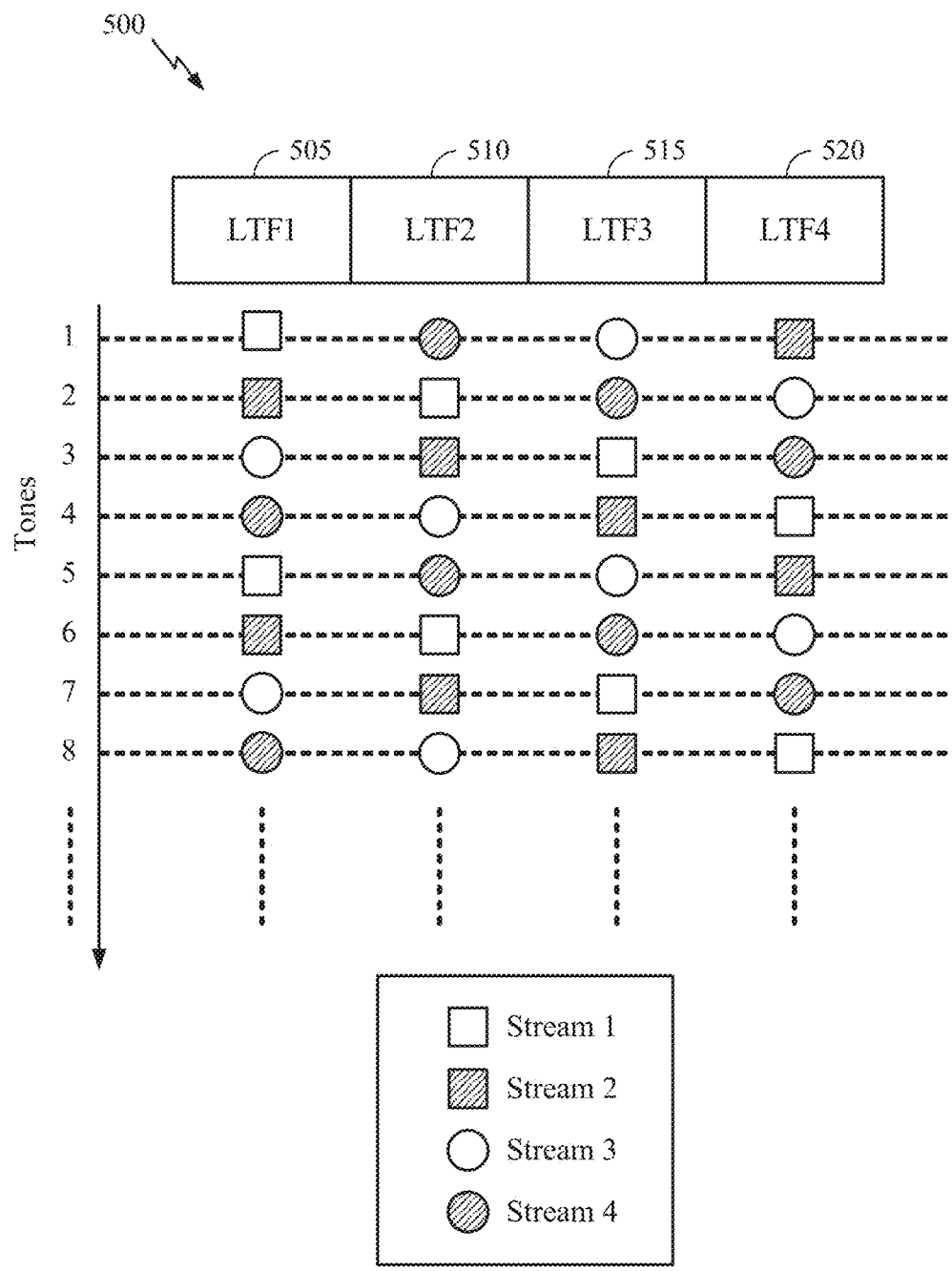
FIG. 5 is an illustration of a tone-interleaved long training field (LTF) format.

For example, one type of LTF format can be a tone-interleaved LTF format. FIG. 5 is an illustration of a tone-interleaved LTF format. In this illustration, four space-time-streams are used, and four LTFs are used, as per Table 1 above. As illustrated, in the first LTF, LTF1 505, space-time-stream 1 transmits on the first tone, the fifth tone, and so on. In a next LTF, LTF2 510, space-time-stream 1 transmits on the second tone, the sixth tone, and so on. Each of the other space-time-streams operates in a similar manner, transmitting on every fourth tone in a given LTF, and rotating which tones it transmits in the subsequent LTF. Accordingly, using such a tone-interleaved LTF structure allows each of the four space-time-streams to transmit at least once on each of the tones of the packet, during one of the LTFs.

In order to reduce the total duration of the LTF portion of a packet when using tone-interleaved LTFs, fewer LTFs can be transmitted. As above and as illustrated in FIG. 5, each space-time-stream can typically transmit on each tone at least once, in one of the LTFs. However, with a reduced number of LTFs, this can no longer be true. For example, in FIG. 5, the number of LTFs transmitted can be reduced to two LTFs (transmitting half the number of LTFs found in an IEEE 802.11ac packet), or to one LTF (transmitting only one-quarter the number of LTFs found in an IEEE 802.11ac packet).

For example, if half the number of LTFs is to be transmitted, it can make sense to transmit, for example, only LTF1 505 and LTF3 515. Transmitting only these two LTFs would allow, for example, space-time-streams 1 and 3 to transmit on each odd-numbered tone, and allow space-time-streams 2 and 4 to transmit on each even-numbered tone. Thus, a device receiving the packet and using the LTFs for channel estimation would be able to identify the channel at which tones 1, 3, 5, and so on that space-time-stream 1 is transmitted on. Based on this information, the receiving device can be configured to interpolate the channel on which the even numbered tones on which space-time-stream 1 is transmitted. Thus, transmitting half the number of LTFs can require a receiving device to interpolate the channels of certain other tones from certain space-time-streams. However, this interpolation can be possible without causing increased error rates, and thus, the reduction in the number of transmitted LTFs, and the reduction in the duration of the transmitted LTFs can still allow more data to be successfully transmitted on the network in a given period of time. Note that, when transmitting two LTFs out of the four illustrated in FIG. 5, it can be easier for devices to interpolate tones when both adjacent tones are transmitted. Accordingly, it can be beneficial to transmit, e.g., LTF1 505 and LTF3 515, so that each stream transmits on every second tone, rather than transmitting, e.g., LTF1 505 and LTF2 510, where this would not be the case.

If the number of LTFs transmitted in FIG. 5 was reduced to one-quarter of the LTFs, any of the four LTFs 505, 510, 515, 520 can be transmitted. Regardless of which LTF is transmitted, a device can need to interpolate three tones for each one tone it receives over a given space-time-stream. However, in some environments, this can be possible without causing too many errors, and can therefore be useful for transmitting more information over the wireless medium in a given period of time.

Note that a tone-interleaved LTF design allows each of the four space-time-streams to transmit on each of the tones. However, this can also be accomplished in a trivial manner by, for example, allowing space-time-stream 1 to transmit over all tones in LTF1 505, allowing space-time-stream 2 to transmit over all tones in LTF2 510, and so on. However, one advantage of a tone-interleaved LTF over such an LTF design can be apparent when it is considered that each of the space-time-streams can be transmitted by a different antenna with a given power level. If a single antenna (space-time-stream) is used to transmit LTF1, this LTF can be transmitted with one-quarter the power as an LTF that is transmitted using four antennas (four space-time-streams). Accordingly, a tone-interleaved LTF can allow for higher transmission power on each of the LTFs, as compared to an LTF design wherein only a single space-time-stream is used on each LTF. These advantages of increased transmission power can also be realized even when transmitting a reduced number of tone-interleaved LTFs. In some aspects, other proportions can also be used to reduce the numbers of LTFs which are transmitted. For example, a number of LTFs can be transmitted which allows each space-time-stream to transmit on every second tone, every third tone, every fifth tone, two out of every three tones, and so on. In each case, a receiving device can use interpolation to interpolate the tones on which a given space-time-stream did not transmit.

LTFs can also be generated in other manners, rather than using tone-interleaved LTFs. For example, a frequency domain P-matrix 605 can be used to generate LTFs. FIG. 6 is an illustration 600 of a matrix that can be used as a frequency domain P-matrix in order to generate LTFs. In such a system, pairs of neighboring tones, such as tones 1 and 2 can have 2 stream orthogonal mappings. For example, the included matrix 605 can be used when two space-time-streams transmit simultaneously on two tones. For example, each pair of two tones can have an orthogonal mapping in frequency like the illustrated mapping.

FIG. 7 illustrates 700 the time-domain counterpart to the frequency domain mapping of illustration 600. This illustration illustrates a time domain counterpart, with a symbol duration of 12.8 µs, and a CP of 3.2 µs. This symbol and CP duration corresponds to four times the ordinary durations used in an IEEE 802.11ac packet. Thus, in illustration 700, the first 3.2 µs corresponds to a cyclic prefix 705. In matrix 605, when a signal is multiplied by 1, this does not shift the signal at all. When a signal is multiplied by −1, this shifts the signal by π radians, which, when the symbol duration is 12.8 µs corresponds to a shift of 6.4 µs.

Accordingly, a first stream 710, corresponding to the first column of matrix 605, and a second stream 715, corresponding to the second column of matrix 605, can transmit simultaneously during an LTF on two different tones, corresponding to the first and second rows of matrix 605. For example, on the first tone, both the first stream 710 and the second stream 715 will not be shifted, as both are multiplied by 1. FIG. 7 is an illustration of the time domain counterpart for the second tone, in which the second stream 715 has been shifted by 6.4 µs. For example, if the normal value that a space-time-stream can transmit on a given tone during an LTF is illustrated in FIG. 7, stream 1 can begin its transmission at 3.2 µs, immediately following the cyclic prefix 705. However, because the second stream 715 has been shifted by 6.4 µs, the transmission from the second stream will be 6.4 µs out of phase with the same transmission from the first stream 710, as illustrated.

A receiving device can thus receive transmissions on the first tone and on the second tone. These transmissions can both contain information from both the first space-time-stream, and the second space-time-stream. A receiving device can be able to determine which portion of the transmission is attributable to each space-time-stream, due to the orthogonality of matrix 605. Accordingly, other orthogonal matrices can be used instead of matrix 605, so long as the matrices are orthogonal, in order to allow receiving devices to determine the contributions of each stream to each of the tones. By using such an orthogonal matrix in an LTF, it should be observed that a single LTF can allow both the first stream 710 and the second stream 715 to transmit on both the first tone and the second tone. And, due to the orthogonality of matrix 615, a receiving device can be able to isolate the transmissions from each of the two streams 710, 715 on each of the two tones. Accordingly, a single LTF can be enable two different space-time-streams to transmit on the same tone. This can reduce the number of LTFs needed in a given packet by a factor of two. Similarly, a larger orthogonal matrix can be used to transmit using more streams on more tones. For example, a 3×3 orthogonal matrix can be used across three tones, to allow three streams to transmit simultaneously across those three tones. Thus, this would allow the number of LTFs needed to be reduced by a factor of three.

Figure 8:
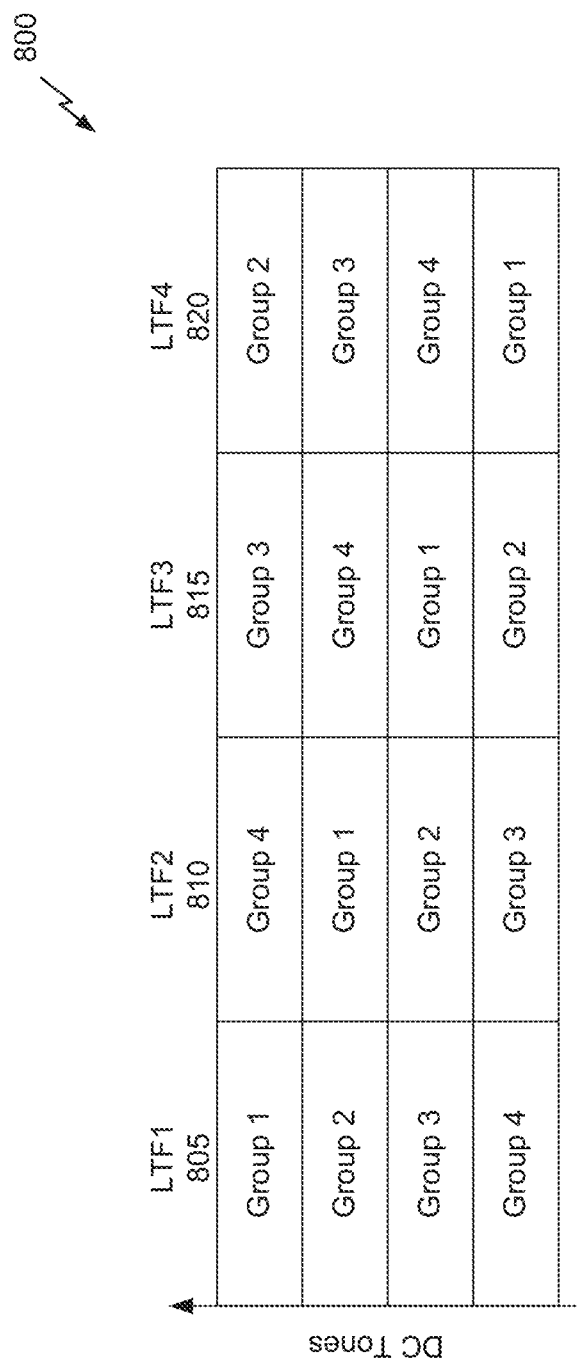
FIG. 8 is an illustration of the interleaving which can be used when transmitting LTFs using an orthogonal matrix scheme as in FIGS. 6 and 7.

FIG. 8 is an illustration of the interleaving which can be used when transmitting LTFs using an orthogonal matrix scheme as in FIGS. 6 and 7. For example, Group 1 can include two different space-time-streams, such as streams 1 and 2. Similarly, each of Groups 2, 3, and 4 can also include two unique streams. Thus, each of eight space-time-streams can be included in the four groups. Similarly, Group 1 can transmit on a certain number of tones, such as two tones, while Group 2 can transmit on the next two tones, Group 3 on the next two tones, and so on. In each subsequent LTF, the tones on which each group of streams transmits on can rotate, such that after four LTFs 805, 810, 815, 820, each of the eight space-time-streams has transmitted on each tone of a given transmission. This interleaving can be similar to the tone interleaving found in FIG. 5, but with each tone being assigned to a group of streams in a single LTF, rather than each tone being assigned to a single stream.

As with the tone-interleaved LTFs earlier, one advantage of such interleaving is that it allows each space-time-stream to transmit during each of the four LTFs 805, 810, 815, 820. Accordingly, each LTF can be transmitted using the same power as each other, and transmitted using the same power as the data portions of the packet. In contrast, if Group 1 transmitted on all tones of LTF1 805, and so on for Group 2 in LTF2 810, this can result in LTFs with different levels of power to each other. Accordingly, such interleaving based on groups can be beneficial.

Another benefit of this matrix-based LTF is that each space-time-stream can be able to transmit on each tone of the packet during an LTF. Unlike the tone-interleaving discussed earlier, here, each space-time-stream transmits on each tone of the packet during at least one LTF. Thus, this approach may not require interpolation as was required for such a tone-interleaved LTF. However, this approach can require slightly more processing by each receiver, in order to differentiate the contributions to each tone from the two streams included in each group. Accordingly, there can be benefits to each of the various approaches described above. Further, the approaches described above can be combined in various ways, as desired. For example, it can be possible to use reduced numbers of orthogonal-matrix-based LTFs that use a different symbol duration than that used in the data portion of a given packet. Other combinations can also be used as well, such as altering the CP duration for any of the above approaches, as needed in order to allow for robust performance in outdoor environments.

In IEEE 802.11ac, there is a short guard interval (GI) mode, in which a shorter-duration cyclic prefix is used. Rather than using a CP of 0.8 µs, a CP of 0.4 µs is used while in the short GI mode. Similarly, a shorter GI mode can also be offered that is still compatible with improved propagation in outdoor environments. For example, if a particular packet typically has a CP of 3.2 µs, a short GI mode can be used in which the CP is only 1.6 µs. In some aspects, the LTF design of a particular packet can vary based on the CP configuration, that is, whether a short GI mode is used or not. For example, if a packet normally has a symbol duration of 12.8 µs, there can be two modes offered—one in which the CP is 3.2 µs, and one in which the CP is 1.6 µs. Based on which of these two modes is used, the LTF portion of the packet can be different. For example, when 3.2 µs CP is used, the symbols in the LTF portion of the packet can be, for example, 6.4 µs or 12.8 µs, while if 1.6 µs CP is used, the symbols in the LTF section can be 3.2 µs or 6.4 µs.

Alternatively, if more than one space-time-stream is present, and if symbols are 12.8 µs in duration while CP can be either 1.6 µs or 3.2 µs (corresponding to 12.5% or 25% CP overhead, as in IEEE 802.11ac), group size can be altered based on the chosen CP. For example, if 3.2 µs CP is used, group size can be 1 or can be 2 (as illustrated in FIG. 6). However, if 1.6 µs is used, group size can be 2 or 4. Accordingly, LTF format can alter based, at least in part, on whether or not a particular packet is being transmitted using a relatively shorter or a relatively longer guard interval.

Figure 9:
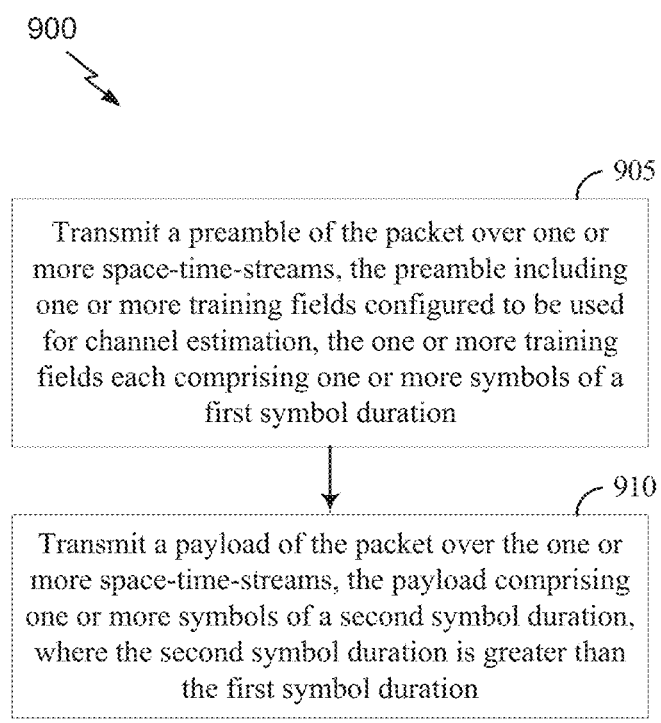
FIG. 9 is an illustration of a method for transmitting a packet.

FIG. 9 is an illustration 900 of a method for transmitting a packet. This method can be done by a wireless communications device, such as a station (e.g., STA 106*b*) via a wireless communication network, including, for example, either an AP 104 or another STA 106 of wireless communication system 100.

At block 905, the wireless communication device transmits a preamble of the packet over one or more space-timestreams, the preamble including one or more training fields configured to be used for channel estimation, the one or more training fields each comprising one or more symbols of a first symbol duration. For example, as discussed above, the symbol duration of training fields used for channel estimation, such as LTFs, can be a duration of 3.2 µs or 6.4 µs. The means for transmitting the preamble can include a transmitter, and the means for generating the transmission can include a processor or other device.

At block 910, the wireless communication device transmits a payload of the packet over the one or more space-time-streams, the payload comprising one or more symbols of a second symbol duration, where the second symbol duration is greater than the first symbol duration. Accordingly, different symbol durations can be used for a payload of a packet and a training field, such as an LTF, of the packet. For example, the symbol duration in the payload of the packet can be 6.4, 12.8, or 25.6 µs, while the symbol duration in the training field can be less than this. The means for transmitting the payload can include a transmitter, and the means for generating the transmission can include a processor or other device. In some aspects, the first symbol duration can be 3.2 µs and the second symbol duration can be 6.4 µs. In other aspects, the first symbol duration can be 6.4 µs and the second symbol duration can be 12.8 µs. Alternatively, the second symbol duration can be 25.6 µs.

In one aspect, the one or more symbols of the first symbol duration can be preceded by a cyclic prefix of a third duration, the one or more symbols of the second symbol duration are preceded by a cyclic prefix of a fourth duration, and the cyclic prefix of the second duration can be greater than the cyclic prefix of the first duration. In some aspects, the third duration can be 0.8 µs and the fourth duration can be 3.2 µs. In other aspects, the third duration can be 0.4 µs and the fourth duration can be 1.6 µs. In various aspects, the one or more symbols of the second symbol duration can each be separated from each other by a cyclic prefix of a third duration, and the first symbol duration can be determined based at least in part on the third duration.

Figure 10:
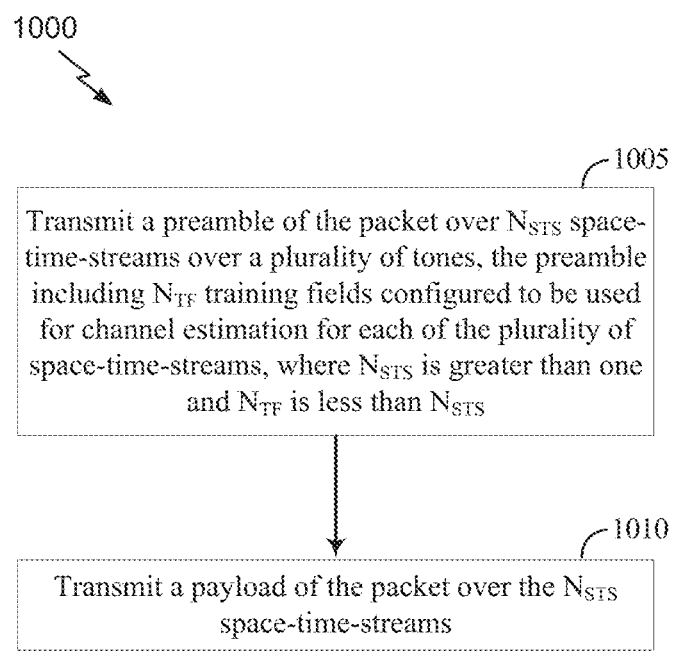
FIG. 10 is an illustration of a method for transmitting a packet.

FIG. 10 is an illustration 1000 of a method for transmitting a packet. This method can be done by a wireless communications device, such as a station (e.g., STA 106b) on a wireless communication network, including, for example, either an AP 104 or another STA 106 in wireless communication system 100.

At block 1005, the wireless communication device transmits a preamble of the packet over $N_{STS}$ space-time-streams over a plurality of tones, the preamble including $N_{LTF}$ training fields configured to be used for channel estimation for each of the plurality of space-time-streams, where $N_{STS}$ is greater than one and $N_{LTF}$ is less than $N_{STS}$. As above, in previous formats, a number of training fields used for channel estimation can have been kept at a level higher than the number of space-time-streams. Accordingly, by transmitting fewer training fields than the number of space-time-streams, an overhead of the packet can be reduced. In some aspects, fewer training fields can be transmitted due to either the tone-interleaving discussed above, or the matrix-based grouping of different space-time-streams in a single training field, as described above. In some aspects, the means for transmitting a preamble can include a transmitter, and the means for generating the preamble can include a processor.

At block 1010, the wireless communication device transmits a payload of the packet over the $N_{STS}$ space-time-streams. In some aspects, the means for generating this packet can include a processor, and the means for transmitting the packet can include a transmitter.

In some aspects, each of the NM training fields can be a tone-interleaved training field transmitted over the plurality of tones, such that each of the space-time-streams of the plurality of space-time-streams transmits on a subset of the plurality of tones and such that each tone of the plurality of tones is transmitted on by exactly one of the plurality of space-time-streams. In some aspects, each of the $N_{TF}$ training fields can be transmitted over the plurality of tones, and each of the plurality of space-time-streams can be part of a group of a plurality of groups, each group transmitting to a subset of the tones of the plurality of tones based upon an orthogonal matrix. Each group of the plurality of groups can include two space-time-streams of the plurality of space-time-streams. Each group of the plurality of groups can include four space-time-streams of the plurality of space-time-streams. A value of $N_{TF}$ can be approximately half a value of $N_{STS}$, or can be approximately one-quarter a value of $N_{STS}$. Both the preamble and the payload can be transmitted with a symbol duration of at least 12.8 µs. Both the preamble and the payload can be transmitted with a cyclic prefix of at least 1.6 µs.

As discussed above, for example with respect to FIG. 6, LTFs can be generated according to a frequency domain P-matrix. In some P-matrix applications, every stream is active on each tone. In various embodiments discussed herein, $N_{STS}$ spatial streams can be subdivided into $N_g$ groups, where each group can include $N_{STS}/N_g$ streams. Each tone can be populated with $N_{STS}/N_g$ spatial streams using a smaller orthogonal P-matrix. Thus, each spatial stream will visit every $N_g$ tones, and channel interpolation can be used to obtain channel estimation on unvisited tones. Accordingly, only a subset of the $N_{STS}$ spatial streams is active on each tone. Advantageously, fewer LTF symbols can be used to orthogonalize the subset of streams, thereby reducing LTF overhead.

FIG. 11A is an illustration of a matrix 1100A that can be used as a frequency domain P-matrix in order to generate LTFs. The illustrated matrix 1100A includes four spatial streams on the y-axis and four LTF time symbols in the time-domain on the x-axis. As will be appreciated by one having ordinary skill in the art, the LTFs in the time-domain on the x-axis can be translated into tones in the frequency domain. In a P-matrix system, each tone, carries all $N_{STS}$ spatial streams by the use of an orthogonal mapping. For example, the illustrated matrix 1100A can be used when four space-time-streams transmit simultaneously on each tone. Each tone can have an orthogonal mapping in frequency as illustrated in FIG. 11A. Each LTF can be determined by multiplying each of four spatial streams x1, x2, x3, and x4, by respective column in the matrix 1100A.

FIG. 11B is a table 1100B showing LTF signals generated using the matrix 1100A of FIG. 11A. As discussed above, each of four spatial streams x1, x2, x3, and x4 can be multiplied by respective columns in the matrix 1100A. Thus, for example, LTF1 can include x1*1+x2*1+x3*1+x4*−1, as shown in the highlighted column 1110A. LTF2 can include x1*−1+x2*1+x3*1+x4*1; LTF3 can include x1*1+x2*−1+x3*1+x4*1; LTF4 can include x1*1+x2*1+x3*−1+x4*1, and so on. Accordingly, each frequency tone includes a combination of all $N_{STS}$ spatial streams, and all four LTFs are used for channel estimation.

In other embodiments, tone grouping can be used to reduce the number of LTFs used for channel estimation. For example, the $N_{STS}$ spatial streams can be subdivided into $N_g$ groups, where each group has $N_{STS}/N_g$ streams. Accordingly, $N_{STS}/N_g$ LTFs can be used with a smaller P-matrix, as shown in FIGS. 12A-12C.

FIG. 12A is an illustration of a matrix 1200A that can be used as a frequency domain P-matrix in order to generate LTFs according to a tone-grouping embodiment. The illustrated matrix 1200A includes two spatial stream groups on the y-axis and two LTF time symbols in the time-domain on the x-axis. As will be appreciated by one having ordinary skill in the art, the LTFs in the time-domain on the x-axis can be translated into tones in the frequency domain. The P-matrix 1200A includes orthogonal mappings. Each LTF can be determined by multiplying each of two spatial stream tone groups by respective values in the matrix 1200A. The matrix 1200A can be described alternatively as two conditional P-matrices of size $N_{STS}$ by $N_{STS}/N_g$, which are tone dependent, as shown in FIG. 12B.

FIG. 12B is an illustration of tone-dependent matrices 1200B and 1205B that can be used as frequency domain P-matrices in order to generate LTFs according to a tone-grouping embodiment. The illustrated odd-tone matrix 1200B includes four spatial streams on the y-axis and two LTF time symbols in the time-domain on the x-axis. As will be appreciated by one having ordinary skill in the art, the LTFs in the time-domain on the x-axis can be translated into tones in the frequency domain. The P-matrix 1200B includes orthogonal mappings. For odd tones, each LTF can be determined by multiplying each of four spatial streams by respective values in the matrix 1200B.

Similarly, the illustrated even-tone matrix 1205B includes four spatial streams on the y-axis and two LTF time symbols in the time-domain on the x-axis. As will be appreciated by one having ordinary skill in the art, the LTFs in the time-domain on the x-axis can be translated into tones in the frequency domain. The P-matrix 1205B includes orthogonal mappings. For even tones, each LTF can be determined by multiplying each of four spatial streams by respective values in the matrix 1205B. Because the matrices 1200B and 1205B are tone-dependent, they are equivalent to the tone-group matrix 1200A of FIG. 12A.

FIG. 12C is a table 1200C showing LTF signals generated using the matrixes 1200A, 1200B, and/or 1205B of FIGS. 12A-12B. As discussed above, each of four spatial streams x1, x2, x3, and x4 can be multiplied by respective values in the matrices 1200A, 1200B, and/or 1205B, according to their tone groupings. Thus, for example, odd tones in LTF1 can include x1*1+x2*1+x3*0+x4*0. Odd tones in LTF2 can include x1*−1+x2*1+x3*0+x4*0, as shown in the highlighted column 1210A. Even tones in LTF1 can include x1*0+x2*0+x3*1+x4*1. Even tones in LTF2 can include x1*0+x2*0+x3*−1+x4*1, as shown in the highlighted column 1210B, and so on. Accordingly, each frequency tone includes only a subset of $N_{STS}$ spatial streams, and only two LTFs are used for channel estimation.

In other words, no frequency tone includes every spatial stream. In the illustrated embodiment, every odd tone is populated with streams x1 and x2. Every even tone is populated with streams x3 and x4. Thus, on a given LTF symbol, each tone is masked by a column of the smaller P-matrix 1200A: $P(N_{STS}/N_g) \times (N_{STS}/N_g)$. Because a given spatial stream may not be included on any given tone, interpolation can be used on neighboring tones to estimate any excluded tone.

Although the matrices and tables of FIGS. 12A-12C illustrate an embodiment with four spatial streams ($N_{STS}$=4), two spatial stream groups ($N_g$=2), and eight tones, a person having ordinary skill in the art will appreciate that other combinations are possible. For example, various other combinations are shown in FIGS. 13A-13C.

FIG. 13A is a table 1300A showing an LTF spatial stream tone mapping according to one embodiment. In the illustrated embodiment, the number of spatial streams ($N_{STS}$=4) is equal to the number of spatial stream groups ($N_g$=4). Thus, there is only one spatial stream in each group. In this case, the P-matrix with tone grouping collapses into the tone-interleaved scheme shown in FIG. 13A.

FIG. 13B is a table 1300B showing an LTF spatial stream tone mapping according to another embodiment. In the illustrated embodiment, the number of spatial streams ($N_{STS}$=3) is not an integer multiple of the number of spatial stream groups ($N_g$=2). Thus, there may not be the same integer number of spatial streams in each group. In the illustrated embodiment, spatial streams are assigned to tones in a balanced or round-robin fashion, with each spatial stream occupying every $N_g/N_{STS}$ tone. For example, the spatial stream x1 occupies tones 1, 2, 4, and 5. The spatial stream x2 occupies tones 1, 3, 4, and 6. The spatial stream x3 occupies tones 2, 3, 5, and 6, and so on. Thus, in the illustrated embodiment of FIG. 13B, power is balanced across all tones, and each stream visits on average ⅔ of the tones. In other embodiments, non-integer multiples of spatial stream groups can be handled differently, for example as shown in FIG. 13C.

FIG. 13C is a table 1300C showing an LTF spatial stream tone mapping according to another embodiment. In the illustrated embodiment, the number of spatial streams ($N_{STS}$=3) is not an integer multiple of the number of spatial stream groups ($N_g$=2). Thus, there may not be the same integer number of spatial streams in each group. In the illustrated embodiment, spatial streams are assigned to tones in weighted or protected fashion. Thus, each spatial stream occupies $N_{STS}$ tones, but some spatial streams share tones with other streams while others occupy streams alone. For example, the spatial stream x1 and x2 occupy tones 1, 3, and 5 together, while the spatial stream x3 occupies tones 2, 4, and 6 alone. In various embodiments, the spatial stream x3 can be assigned to occupy tones alone based on a stream protection (for example, stream x3 can have a higher MCS than streams x1 and/or x2). Accordingly, the spatial stream x3 can have more desirable CFO and timing error protection. In the illustrated embodiment, there is higher power on odd tones, and each stream will visit on average half of the tones. In some embodiments, balanced power on all tones can be achieved by power boosting even tones by, for example, 3 dB. In this case, stream x3 can also benefit from better channel estimation (hence better noise protection).

Figure 14:
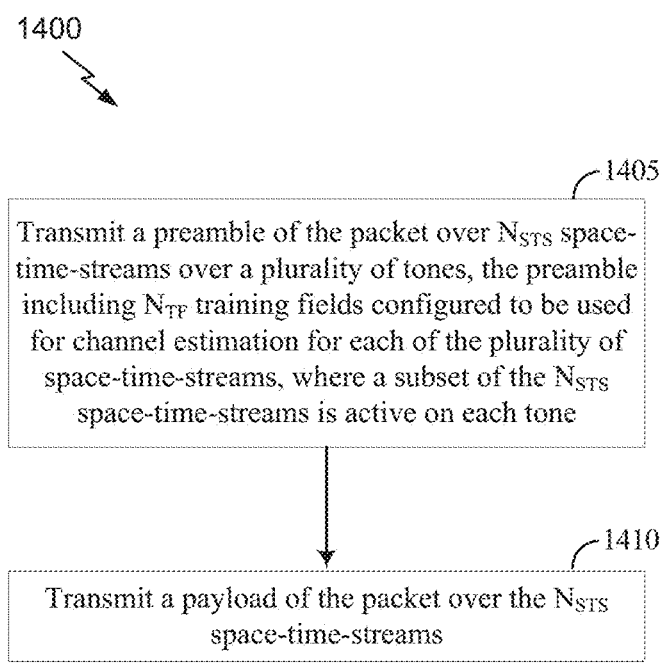
FIG. 14 is an illustration of another method for transmitting a packet.

FIG. 14 is an illustration 1400 of another method for transmitting a packet. This method can be done by a wireless communications device, such as a station on a wireless communication network, including either an AP 144 or another STA 146 on a network. Although various blocks are shown in the illustration 1400, a person having ordinary skill in the art will appreciate that blocks can be added, removed, or reordered within the scope of the present disclosure.

At block 1405, the wireless communication device transmits a preamble of the packet over $N_{STS}$ space-time-streams over a plurality of tones, the preamble including $N_{LTF}$ training fields configured to be used for channel estimation for each of the plurality of space-time-streams. A subset of the $N_{STS}$ space-time-streams is active on each tone. As discussed above with respect to FIGS. 12-13, grouping the space-time-steams can result in a smaller P-matrix. Accordingly, by transmitting fewer training fields than the number of space-time-streams, an overhead of the packet can be reduced. In various embodiments, $N_{STS}$ is greater than one and $N_{LTF}$ is less than $N_{STS}$. In some aspects, fewer training fields can be transmitted due to the matrix-based grouping of different space-time-streams in a single training field, as described above. In some aspects, the means for transmitting a preamble can include a transmitter, and the means for generating the preamble can include a processor.

In various embodiments, each of the $N_{TF}$ training fields can be transmitted over the plurality of tones. Each of the plurality of space-time-streams can be part of a group of a plurality of $N_g$ groups. Each group can transmit to a subset of the tones of the plurality of tones based upon an orthogonal matrix.

In various embodiments, for each training field, each tone can be masked by a column of a P-matrix of size $N_{STS}/N_g$ by $N_{STS}/N_g$. In various embodiments, $N_g=N_{STS}$ and a single training field can be transmitted over the plurality of space-time-streams interleaved over the plurality of tones.

In various embodiments, $N_{STS}$ can be not an integer multiple of $N_g$ and each space-time-steam visits on average $N_g/N_{STS}$ of the plurality of tones. In various embodiments, $N_{STS}$ can be not an integer multiple of $N_g$ and each space-time-stream visits on average $N_g$ of the plurality of tones. In various embodiments, every odd tone can be populated with a first subset of space-time-streams and every even tone can be populated with a second subset of space-time streams.

At block 1410, the wireless communication device transmits a payload of the packet over the $N_{STS}$ space-time-streams. In some aspects, the means for generating this packet can include a processor, and the means for transmitting the packet can include a transmitter.

It should be understood that any reference to an element herein using a designation such as "first," "second," and so forth does not generally limit the quantity or order of those elements. Rather, these designations can be used herein as a convenient wireless device of distinguishing between two or more elements or instances of an element. Thus, a reference to first and second elements does not mean that only two elements can be employed there or that the first element must precede the second element in some manner. Also, unless stated otherwise a set of elements can include one or more elements.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein can be implemented as electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-7 can be implemented within or performed by an integrated circuit (IC), an access terminal, or an access point. The IC can include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and can execute codes or instructions that reside within the IC, outside of the IC, or both. The logical blocks, modules, and circuits can include antennas and/or transceivers to communicate with various components within the network or within the device. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. The functionality of the modules can be implemented in some other manner as taught herein. The functionality described herein (e.g., with regard to one or more of the accompanying figures) can correspond in some aspects to similarly designated "means for" functionality in the appended claims.

If implemented in software, the functions can be stored on or transmitted over as one or more instructions or code on a computer-readable medium. The steps of a method or algorithm disclosed herein can be implemented in a processor-executable software module which can reside on a computer-readable medium. Computer-readable media includes both computer storage media and communication media including any medium that can be enabled to transfer a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and instructions on a machine readable medium and computer-readable medium, which can be incorporated into a computer program product.

It is understood that any specific order or hierarchy of steps in any disclosed process is an example of a sample approach. Based upon design preferences, it is understood that the specific order or hierarchy of steps in the processes can be rearranged while remaining within the scope of the present disclosure. The accompanying method claims present elements of the various steps in a sample order, and are not meant to be limited to the specific order or hierarchy presented.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising:
transmitting a preamble of a packet over $N_{STS}$ space-time-streams over a plurality of tones, the preamble including $N_{TF}$ training fields for estimating a channel for each of the $N_{STS}$ space-time-streams, wherein $N_{STS}$ is greater than one, $N_{TF}$ is less than $N_{STS}$, and at least one group of the $N_{STS}$ space-time-streams is transmitted on a subset of the plurality of tones based on an orthogonal matrix; and
transmitting a payload of the packet over the $N_{STS}$ space-time-streams.

2. The method of claim 1, wherein each of the $N_{TF}$ training fields is tone-interleaved, the method further comprising:
transmitting one of the $N_{STS}$ space-time-streams on each tone of a subset of the plurality of tones.

3. The method of claim 1, wherein each group of the at least one group includes two or four $N_{STS}$ space-time-streams.

4. The method of claim 1, wherein $N_{TF}$ is approximately half or approximately one-quarter of $N_{STS}$.

5. The method of claim 1, further comprising:
transmitting the preamble and the payload with at least a 1.6 μs or 12.8 μs symbol duration.

6. A wireless communication apparatus, comprising:
one or more processors; and
a memory storing instructions that, when executed by the one or more processors, cause the wireless communication apparatus to perform operations comprising:
transmitting a preamble of a packet over $N_{STS}$ space-time-streams over a plurality of tones, the preamble including $N_{TF}$ training fields for estimating a channel for each of the $N_{STS}$ space-time-streams, wherein $N_{STS}$ is greater than one, $N_{TF}$ is less than $N_{STS}$, and at least one group of the $N_{STS}$ space-time-streams is transmitted on a subset of the plurality of tones based on an orthogonal matrix; and
transmitting a payload of the packet over the $N_{STS}$ space-time-streams.

7. The wireless communication apparatus of claim 6, wherein each of the $N_{TF}$ training fields is tone-interleaved, the operations further comprising:
transmitting one of the $N_{STS}$ space-time-streams on each tone of a subset of the plurality of tones.

8. The wireless communication apparatus of claim 6, wherein each group of the at least one group includes two or four $N_{STS}$ space-time-streams.

9. The wireless communication apparatus of claim 6, wherein $N_{TF}$ is approximately half or approximately one-quarter of $N_{STS}$.

10. The wireless communication apparatus of claim 6, the operations further comprising:
transmitting the preamble and the payload with at least a 1.6 μs or 12.8 μs symbol duration.

11. A non-transitory computer readable storage medium comprising instructions that, when executed by one or more processors of an apparatus, cause the apparatus to perform operations comprising:
transmitting a preamble of a packet over $N_{STS}$ space-time-streams over a plurality of tones, the preamble including $N_{TF}$ training fields for estimating a channel for each of the $N_{STS}$ space-time-streams, wherein $N_{STS}$ is greater than one, $N_{TF}$ is less than $N_{STS}$, and at least one group of the $N_{STS}$ space-time-streams is transmitted on a subset of the plurality of tones based on an orthogonal matrix; and
transmitting a payload of the packet over the $N_{STS}$ space-time-streams.

12. The non-transitory computer readable storage medium of claim 11, wherein each of the $N_{TF}$ training fields is tone-interleaved, the operations further comprising:
transmitting one of the $N_{STS}$ space-time-streams on each tone of a subset of the plurality of tones.

13. The non-transitory computer readable storage medium of claim 11, wherein each group of the at least one group includes two or four $N_{STS}$ space-time-streams.

14. The non-transitory computer readable storage medium of claim 11, wherein $N_{TF}$ is approximately half or approximately one-quarter of $N_{STS}$.

15. The non-transitory computer readable storage medium of claim 11, the operations further comprising:
transmitting the preamble and the payload with at least a 1.6 μs or 12.8 μs symbol duration.

16. A wireless communication apparatus, comprising:
means for transmitting a preamble of a packet over $N_{STS}$ space-time-streams over a plurality of tones, the preamble including $N_{TF}$ training fields for estimating a channel for each of the $N_{STS}$ space-time-streams, wherein $N_{STS}$ is greater than one, $N_{TF}$ is less than $N_{STS}$, and at least one group of the $N_{STS}$ space-time-streams is transmitted on a subset of the plurality of tones based on an orthogonal matrix; and means for transmitting a payload of the packet over the $N_{STS}$ space-time-streams.

17. The wireless communication apparatus of claim 16, wherein each of the $N_{TF}$ training fields is tone-interleaved, the apparatus further comprising:

means for transmitting one of the $N_{STS}$ space-time-streams on each tone of a subset of the plurality of tones.

18. The wireless communication apparatus of claim 16, wherein each group of the at least one group includes two or four $N_{STS}$ space-time-streams.

19. The wireless communication apparatus of claim 16, wherein $N_{TF}$ is approximately half or approximately one-quarter of $N_{STS}$.

20. The wireless communication apparatus of claim 16, the apparatus further comprising:

means for transmitting the preamble and the payload with at least a 1.6 µs or 12.8 µs symbol duration.

* * * * *